UNITED STATES PATENT OFFICE.

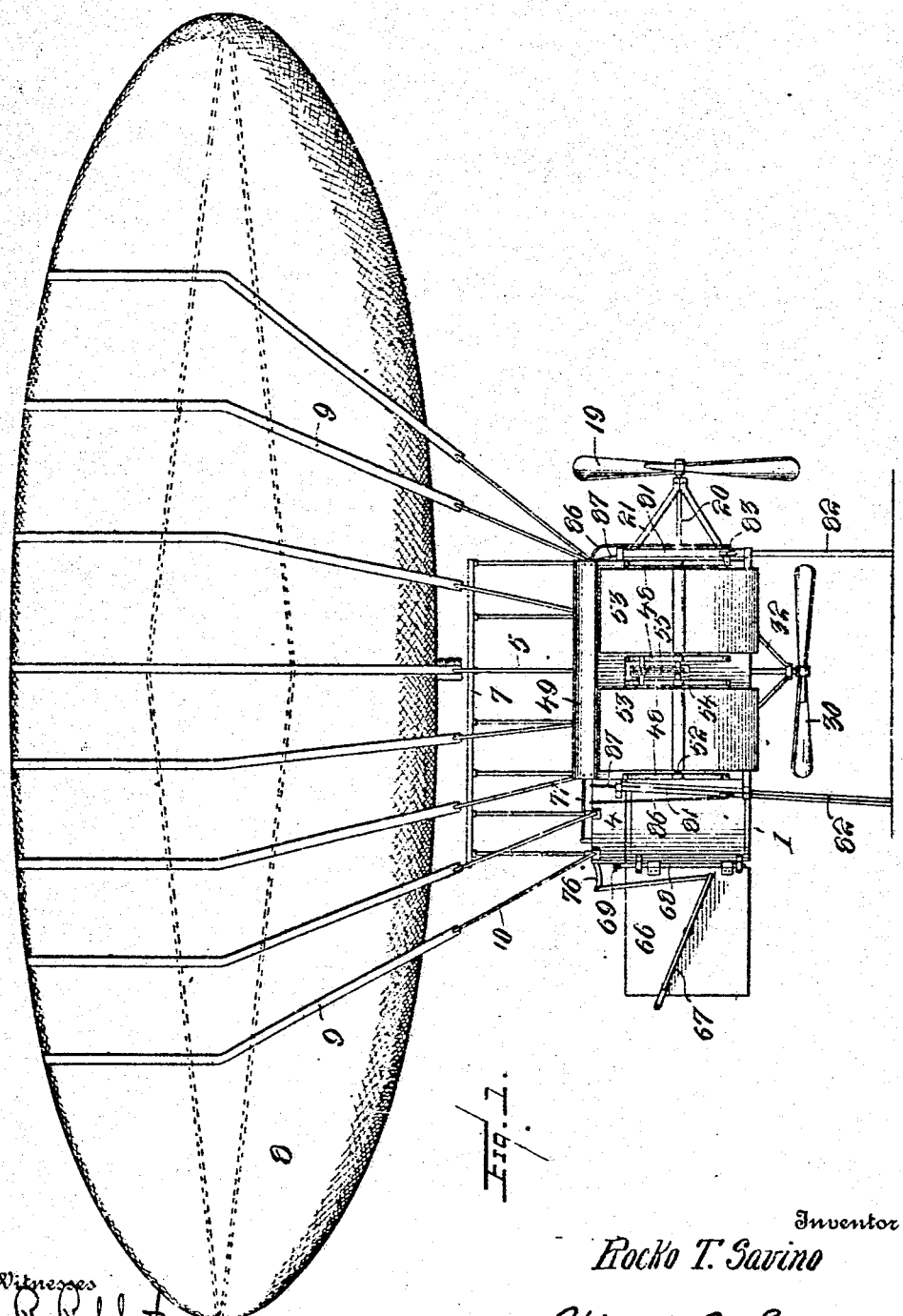

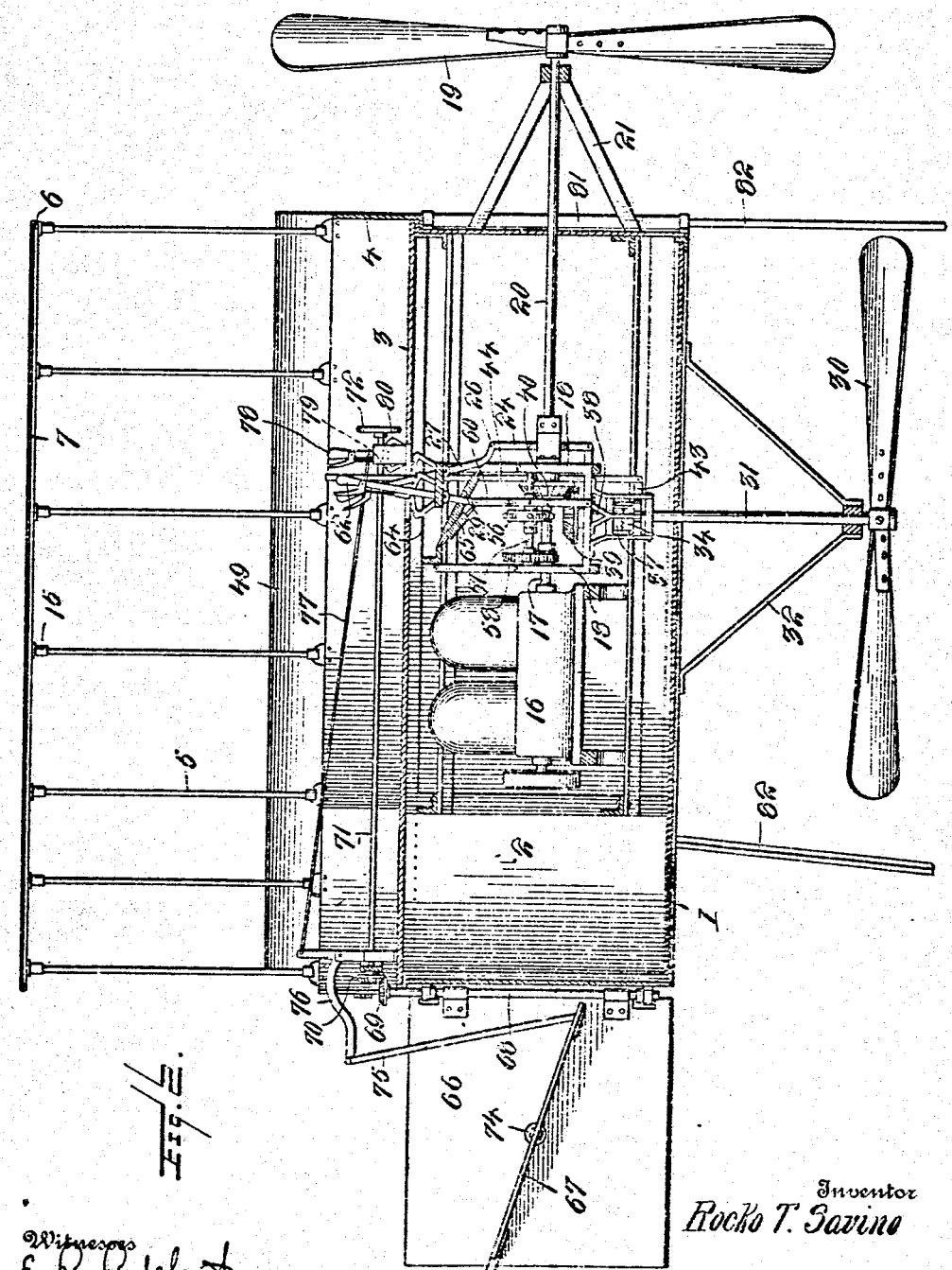

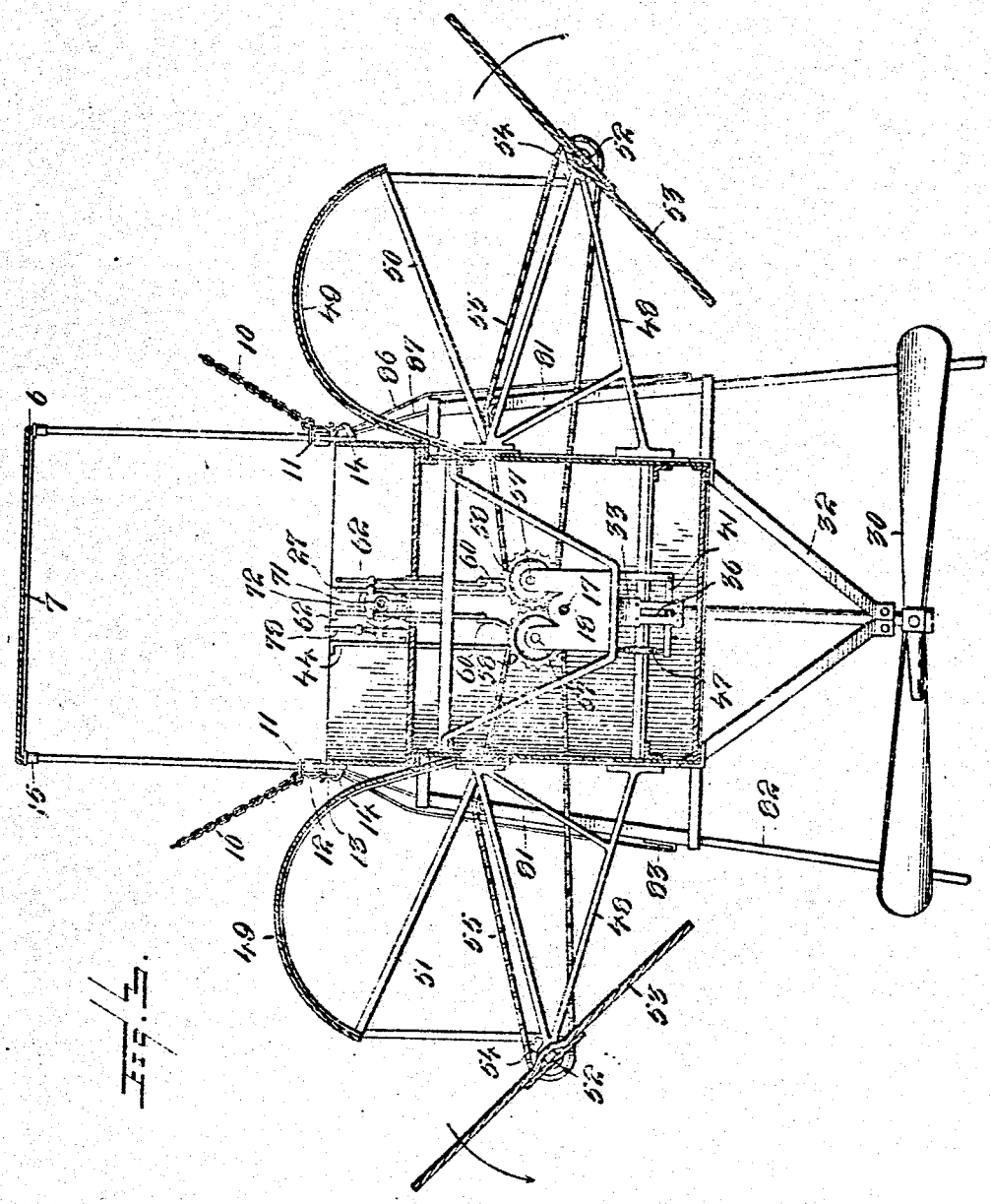

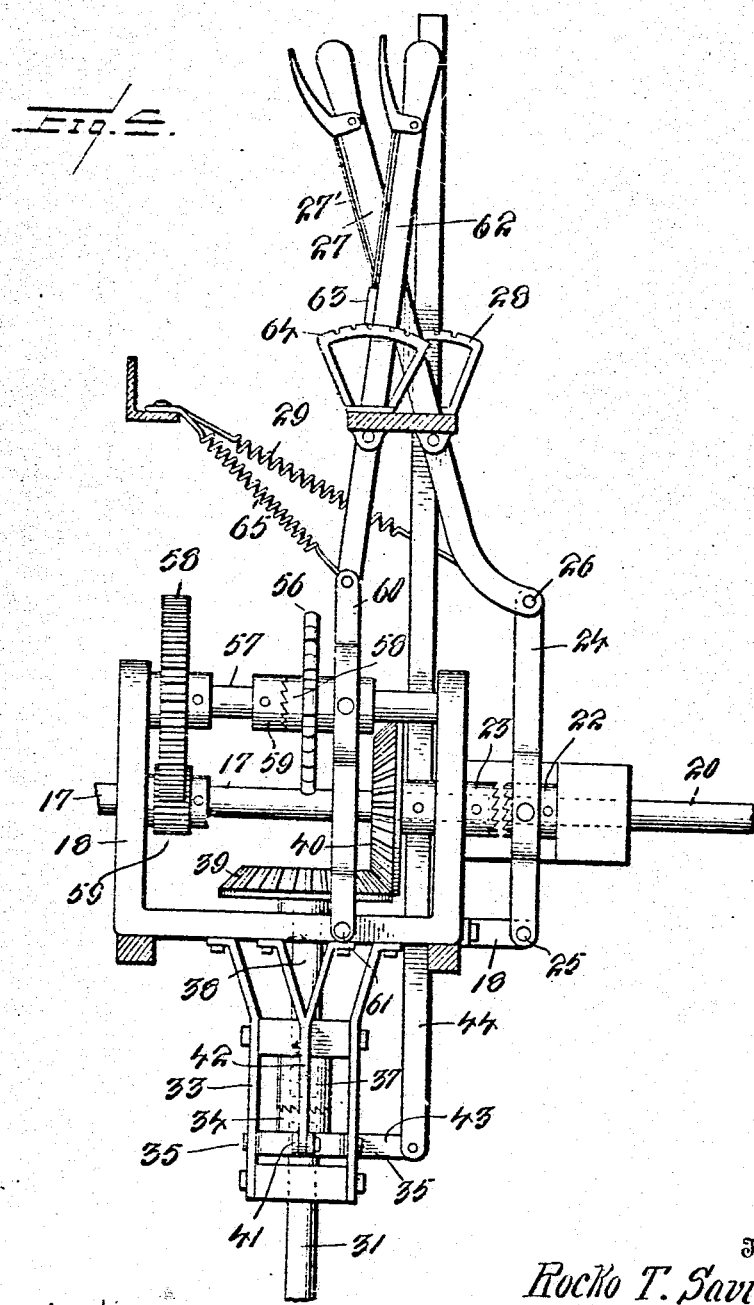

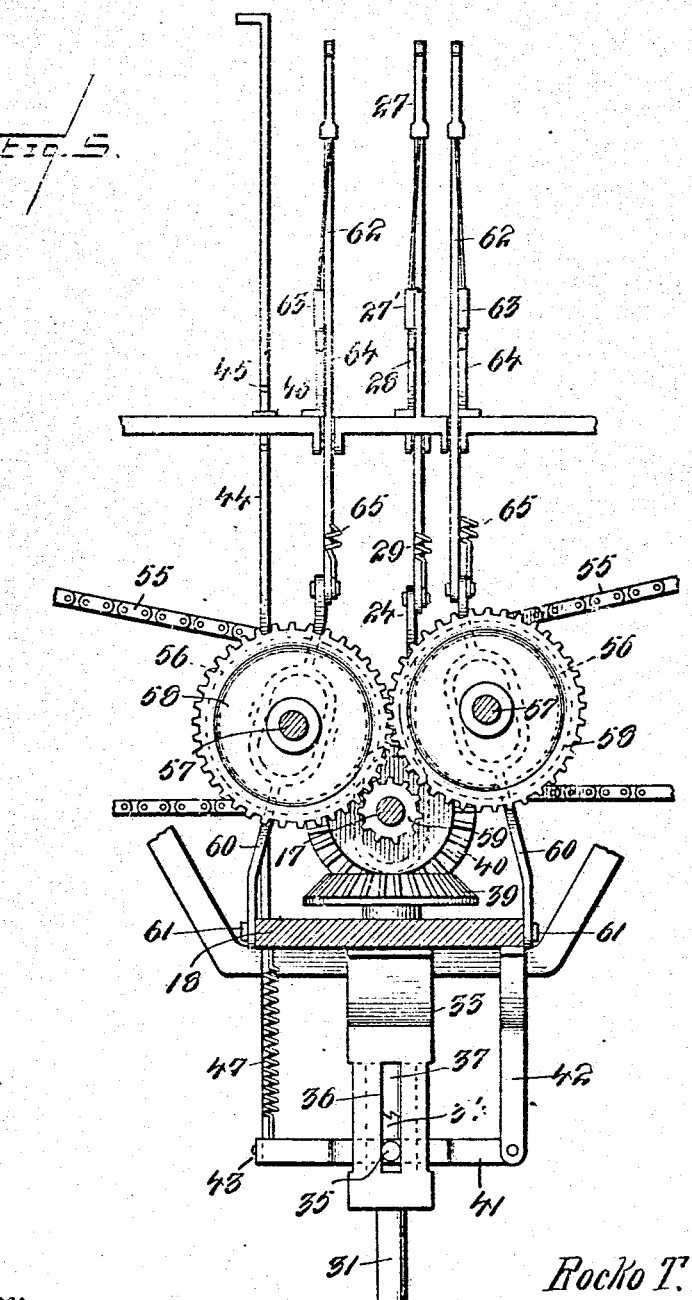

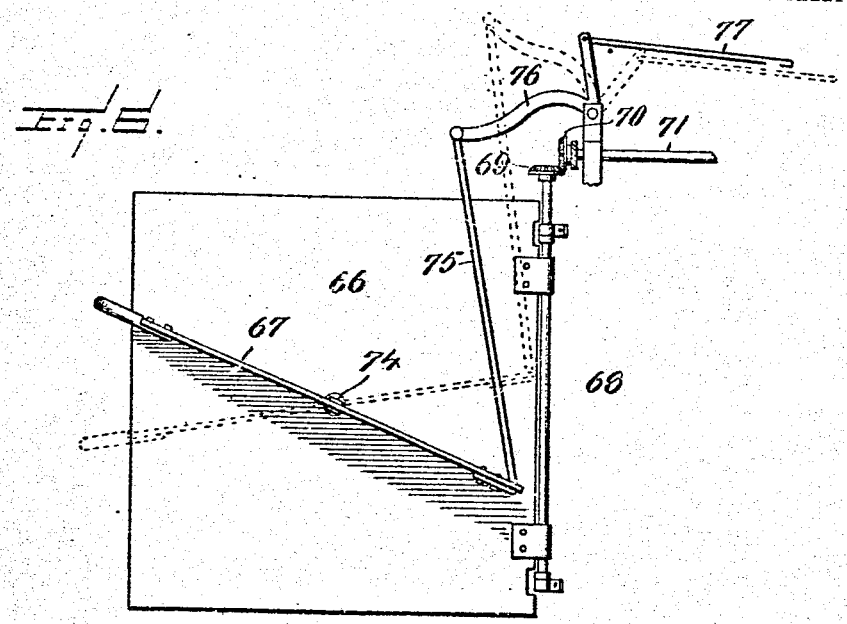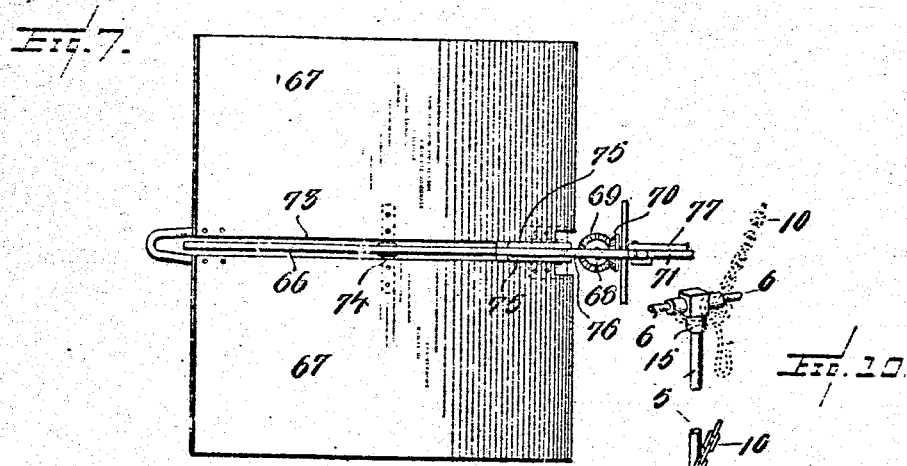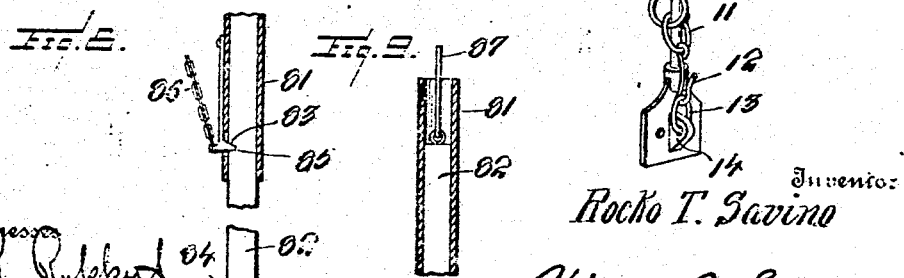

ROCKO T. SAVINO, OF NEW YORK, N. Y.

FLYING-MACHINE.

973,389.  Specification of Letters Patent.  Patented Oct. 18, 1910.

Application filed February 5, 1910. Serial No. 542,251.

*To all whom it may concern:*

Be it known that I, ROCKO T. SAVINO, a subject of the King of Italy, residing at New York, in the county of New York and State of New York, have invented new and useful Improvements in Flying-Machines, of which the following is a specification.

This invention relates to air ships of the dirigible balloon type, and its object is to provide an aerial vessel of this character which may be readily steered vertically and horizontally, positively propelled in both a forward and an upward direction, and retarded in its descent, in the event of injury to the balloon, whereby the easy and safe return to the ground will be insured.

The invention consists of the features of construction, combination and arrangement of parts hereinafter fully described and claimed, reference being had to the accompanying drawings, in which:—

Figure 1 is a side elevation of an air ship embodying my invention. Fig. 2 is a vertical longitudinal section of the same, omitting the gas bag. Fig. 3 is a vertical transverse section. Fig. 4 is an enlarged side elevation of the drive gearing. Fig. 5 is a front elevation of the same. Fig. 6 is a side elevation of the steering rudders. Fig. 7 is a top plan view of the same. Figs. 8 and 9 are views of one of the supporting legs and coöperating parts. Fig. 10 is a view of one of the upper frame stanchions and associated suspension chain.

Referring to the drawings, 1 designates a car or main frame of suitable size, shape and material, and constructed to provide a chamber or compartment 2 to contain the motor and drive gearing and a deck or platform 3 to support the operator, passengers, etc., said platform being surrounded by an upwardly extending guard wall 4. Rising from the sides of the wall 4 are rods or stanchions 5 suitably connected and reinforced at their upper ends by rods or bars 6 and covered by fabric or other suitable material 7 to provide an overhead protecting canopy. This canopy also serves in flight as a plane against which the air impinges to assist in supporting the vessel in the atmosphere.

The car is suspended from a balloon 8, which is preferably substantially cigar-shaped or of any analogous form to diminish its resistance to passage through the air, and may be of any desired construction to present the necessary rigidity to maintain its form against the air pressure in flight. The balloon is provided with hangers 9 with which are connected the upper ends of suspension cables or chains 10, which are provided at their lower ends with rings or eyes 11 to engage the rods or stanchions 5 and with hooks or similar elements 12 to interlock with coupling rings 13 pivotally supported by lugs or projections 14 on the sides of the guide wall 4. The balloon may be of sufficient capacity to sustain the whole or the greater portion of the weight of the vessel, and is normally held down in close proximity to the car by the engagement of the hooks with the coupling ring. If it should be desired, however, to allow the currents of air to act more forcibly against the surface of the balloon or to suspend the car at a further point below the same, the hooks may be disengaged from the ring and the eyes 11 allowed to slide upwardly on the stanchions 5 until they engage collars 15 at the upper ends of said stanchions.

Arranged within the compartment 2 is a suitable driving motor 16, the shaft 17 of which extends horizontally in a rearward direction and turns in suitable bearings in a bracket or frame 18. Disposed at the rear of the car is a vertically arranged forward driving propeller 19 mounted on the rear end of a shaft 20 journaled in a bearing bracket 21, the forward end of which shaft is journaled in the frame or bracket 18 and carries a clutch member 22 adapted to be engaged with and disengaged from a clutch member 23 on the rear end of the motor shaft 17 by sliding the shaft 20 forwardly and rearwardly. To effect these sliding movements, the clutch member 22 is pivotally connected with a link 24, pivotally attached at its lower end, as at 25, to the bracket 18 and pivotally attached at its upper end, as at 26, to an operating lever 27 extending upwardly through an opening in the platform 3 and provided with a pawl 27' to engage a fixed rack 28, whereby it may be locked in adjusted position to hold the clutch member 22 in or out of engagement of the clutch member 23. A spring 29 connects the lever 27 with a suitable portion of the car and operates to throw the clutch member 22 into action when the lever 27 is released for such movement. It will thus be understood that the propeller 19 may be connected with the motor for driving the vessel forwardly, and disconnected therefrom when it is desired to stop the forward propelling action.

Arranged below the car is a horizontally revoluble lifting propeller 30 having blades of proper pitch to effect a lifting action, said propeller being mounted upon the lower end of a vertical shaft 31 journaled in a bearing bracket 32 and in a depending extension 33 from the bracket 18. The upper end of this shaft is provided with a clutch member 34 having lateral guide pins 35 movable in vertical slots 36 in said extension 33 and adapted by a vertical sliding motion of the shaft to be thrown into and out of engagement with a clutch member 37 on the lower end of a short vertical shaft 38, which shaft bears at its upper end a bevel gear 39 meshing with a similar gear 40 on the motor shaft, by which the lifting propeller may be driven. Pivotally engaging the pins 35 is a link 41 pivoted at one end to a fixed arm 42 and having at its opposite end a right angularly bent arm 43 pivoted to the lower end of a vertically sliding operating bar 44. By adjusting this latch bar up or down the clutch member 34 may be thrown into or out of engagement with the clutch member 37 to drive the propeller 30 or stop the driving action thereof. The bar 44 is formed with properly disposed notches 45 to engage the edge of a locking plate 46 on the platform, whereby it may be held in clutch closing or clutch opening position, and a spring 47 connects the arm 43 with the bracket 18 to shift the clutch members into engagement as soon as the bar is released for such purpose. The propeller 30 is employed to lift the vessel in starting a flight to the desired elevation, and during the course of travel of the vessel in a forward direction may be revolved slowly to assist in sustaining the vessel. When it is desired to descend this propeller may be reversely revolved by reversing the motor or using a reversing gearing, so as to regulate the speed of descent.

Extending at right angles from the sides of the car are bearing brackets 48, above which are arranged outwardly, upwardly and downwardly curved wings 49, which are connected with the car and adjacent bracket, respectively, by braces 50 and 51. Journaled in bearings on the brackets 48 are shafts 52 arranged horizontally and parallel with the car, and each carrying a pair of propeller blades 53, the blades of each pair being arranged side-by-side in the same plane and extending equally beyond opposite sides of the shaft. The respective sets of propellers 53 are flat and are normally designed to rotate in an outward direction as indicated by arrows in Fig. 3, to exert a downward beating pressure on the air and thus act as sustaining mediums in connection with the balloon and lifting propeller to support the vessel. These propellers are preferably kept working at all times for their sustaining effect, and by reversing the motor or through the use of reversing gearing may be revolved with the lifting propeller in a direction reverse to the direction of revolution to facilitate descent of the vessel. If from any cause the balloon should collapse or be otherwise rendered inoperative as a supporting medium, the vessel may be caused to descend safely by a gliding action through the use of the steering means hereinafter described, and by controlling its descent through the operation of said lifting and sustaining propellers. The shafts 52 carry sprocket wheels 54 which are connected by driving chains 55 with sprocket wheels 56 on a pair of countershafts 57 journaled in the bracket 18, which countershafts carry intermeshing gears 58 driven in reverse direction by a pinion 59 on the motor shaft 17. Each sprocket wheel 56 is loosely mounted on its shaft 57 and is provided with a clutch member 58 to engage a coacting clutch member 59 on the shaft, so that said sprocket wheel may be fixed to or allowed to turn loosely on the shaft to start or stop the operation of the sustaining propeller at will. Each sprocket wheel is pivotally connected to a link or shifting member 60 pivoted at its lower end, as at 61, to the bracket 18 and at its upper end to the lower end of a controlling lever 62 having a pawl 63 to engage a rack 64 on the platform, by which the lever may be locked in adjusted position to hold the clutch members into or out of engagement. A spring 65 connects the link or lever with some suitable part of the car to throw the clutch members in engagement as soon as the lever is released for such action. The wings 49 serve as guards for the propellers and also as sustaining surfaces to assist in supporting the machine. They further act as stationary fins or stabilizing planes to guide the vessel in a straight course and prevent the bobbing up and down or fluctuations of vessels of this character under the action of wind currents on the balloon, where such vessels are unprovided with some means of this nature.

The means for steering the vessel horizontally and vertically comprises rudders 66 and 67 arranged at the front of the car. The rudder 66 is vertically positioned and mounted to swing laterally upon a shaft 68 journaled in suitable bearings and carrying at its upper end a bevel gear 69 meshing with a similar gear 70 on the forward end of a horizontal controlling shaft 71 extending rearwardly over the platform and provided at its rear end with an operating wheel 72. The rudder 67 is horizontally arranged to swing in a vertical plane and is bifurcated or slotted in a fore and aft direction, as at 73, for the passage of the rudder 66 which extends therethrough, equal portions of the rudder 67 being arranged on opposite sides of said rudder 66. The rudder 67 has its portions connected by a shaft 74 extending across the slot 73 and through the rudder 66 and journaled in a suitable bearing in the latter, by which the horizontal rudder is mounted to swing upon the vertical rudder, as will be readily understood. Connecting rods 75 are pivotally coupled at their rear ends to the inner rear corners of the sections of the horizontal rudder and extend upwardly therefrom on opposite sides of the vertical rudder and are pivotally coupled at their upper ends to a bell-crank lever 76 mounted upon the front of the car and connected by a rearwardly extending connecting rod 77 with an operating lever 78 having a pawl 79 to engage a rack 80, whereby the rudder may be secured in any of its adjusted positions. The rods 75 are spaced a sufficient distance apart and the lever 76 is sufficiently flexible to permit the rudder 66 to have the necessary degree of swinging movement to the right or left to steer the vessel and permit it to turn in an arc of the desired radius. All of the controlling levers hereinbefore described are arranged adjacent each other in proximity to the position of the operator so that one or more of them may be operated singly or in unison at any time in a convenient manner to place the vessel under complete control.

The car or frame, which is preferably of oblong rectangular form, is provided at each of its corners with a guide sleeve or tube 81 within each of which is slidably mounted a supporting leg 82, which supporting legs are adapted to be extended to sustain the vessel when it rests upon the surface of the ground and to be withdrawn upwardly into said tubes when the vessel is in flight. On each tube is a spring latch 83 projecting into a slot therein to engage notches 84 and 85 in the leg, by which the latter may be secured in its retracted and projected positions. A chain or other connection 86 leads from the car to the latch, whereby the latter may be withdrawn from engagement with the leg to allow the latter to drop by gravity for the automatic extension of the legs in making ready to alight. A cord or other connection 87 extends from each leg to the car, whereby the legs may be withdrawn into the guides after the vessel has cleared the earth in making an ascent.

From the foregoing description, taken in connection with the accompanying drawings, the construction and mode of operation of my improved air ship will be readily understood, and it will be seen that a vessel of this character is provided which may be driven and steered in all directions, and which in the event of injury to the balloon may be safely guided in its descent and caused to land easily and without damage to the main frame and gearing.

Having described my invention, I claim:—

1. In a flying machine, the combination of a frame, steering and propelling means carried thereby, uprights rising from the frame and provided at their lower ends with engaging members and at their upper ends with stops, a balloon, and suspension devices depending from the balloon and having guide members slidably engaging the uprights and devices to interlock with said engaging members.

2. In a flying machine, the combination of a frame, steering and propelling means carried thereby, uprights rising from the frame, a balloon, and suspension devices depending from the balloon and slidably engaging the uprights, said devices being adapted for connection with the uprights at different elevations for supporting the frame closer to or farther from the balloon.

3. In a flying machine, the combination of a frame, propelling and steering means carried thereby, a canopy supported upon the frame and including uprights having locking members at their lower ends and stops at their upper ends, a balloon, flexible suspension devices depending from the balloon, rings carried by said devices and slidably engaging the uprights, and locking members also carried by said devices to engage said locking members at the lower ends of the uprights.

4. A flying machine embodying a frame, means for propelling the same forward, suitable steering means, brackets extending outwardly at the opposite sides of the frame, hood-shaped wings at the sides of the frame above said brackets, bracing connections between the frame, wings, and brackets, longitudinally extending shafts journaled on the brackets, beaters upon the shafts, each comprising a pair of flat blades spaced apart and extending in the same plane and projecting beyond diametrically opposite sides of the shaft, a gear element on each shaft between the blades of the wings, a motor, driving connections between the motor and the respective gear elements, and means for operating said driving connections singly or in unison.

5. A flying machine embodying a frame, a motor, a drive gear and a drive pinion upon the shaft of the motor, a vertical transmission shaft, endwise movable vertical and horizontal shafts, lifting and driving propellers carried by said shaft, clutch members upon the respective shafts, for throwing the vertical and horizontal shafts into and out of engagement with the transmission motor shafts through endwise movements of said vertical and horizontal shafts, countershafts, gears thereon meshing with the pinion of the motor shaft, a gear on the transmission shaft meshing with the gear on the motor shaft, sprocket gears on the counter-shafts, clutches for throwing the same into and out of operation, rotary beaters at the sides of the frame, a gearing for driving the same including the sprocket chains passing over said sprocket wheels on the counter-shafts.

6. A flying machine comprising a frame, a vertical shaft journaled thereon, a vertical rudder carried by said vertical shaft, gearing for oscillating the vertical shaft and bifurcated horizontal rudder through which the vertical rudder passes, said horizontal rudder having portions disposed on opposite sides of said vertical rudder, a horizontal shaft extending through the vertical rudder and journaled therein and connecting the portions of the horizontal rudder, a bell crank lever, means for operating the same, and a link connecting said bell crank lever with the horizontal rudder.

In testimony whereof I affix my signature in presence of two witnesses.

ROCKO T. SAVINO.

Witnesses:
 HARRY DELAY.
 C. C. HINES.